July 15, 1924.　　　　　　　　　　　　　　　1,501,295
W. E. WILSON
FOCUSING VIEW FINDER
Filed Oct. 5, 1921　　　　3 Sheets-Sheet 1
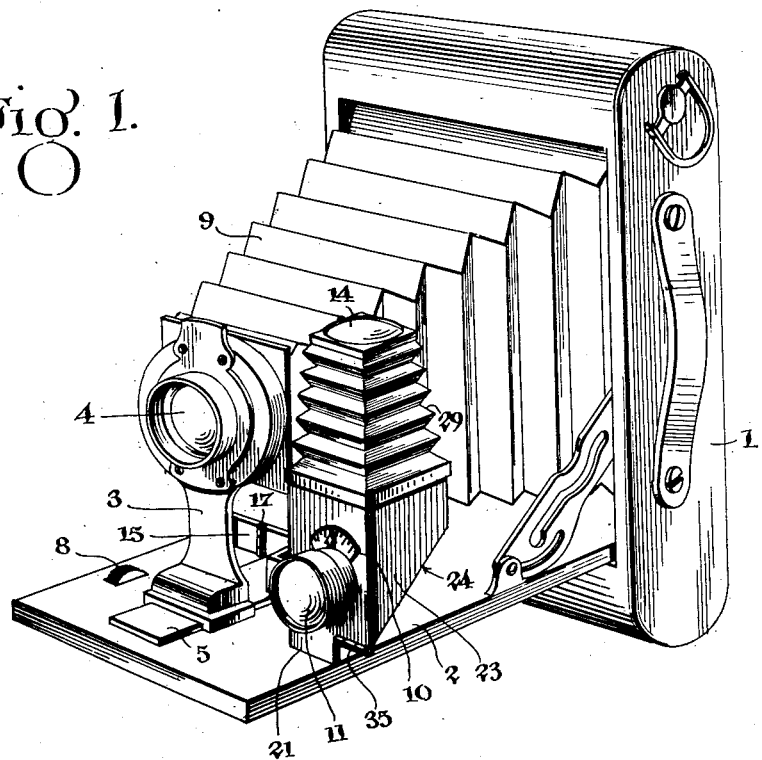
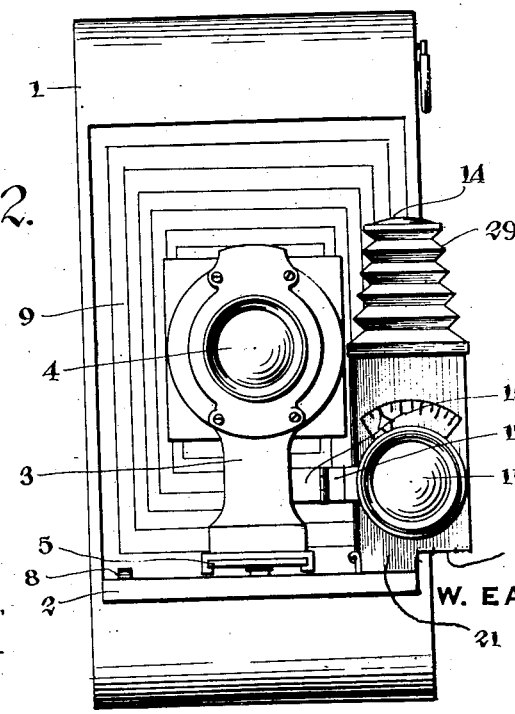
WITNESSES
INVENTOR
W. EARL WILSON.
BY
ATTORNEYS July 15, 1924.

W. E. WILSON

FOCUSING VIEW FINDER

Filed Oct. 5, 1921

1,501,295

3 Sheets-Sheet 2

WITNESSES

W. EARL WILSON.
INVENTOR

BY

ATTORNEYS

July 15, 1924.
W. E. WILSON
FOCUSING VIEW FINDER
Filed Oct. 5, 1921      3 Sheets-Sheet 3
1,501,295
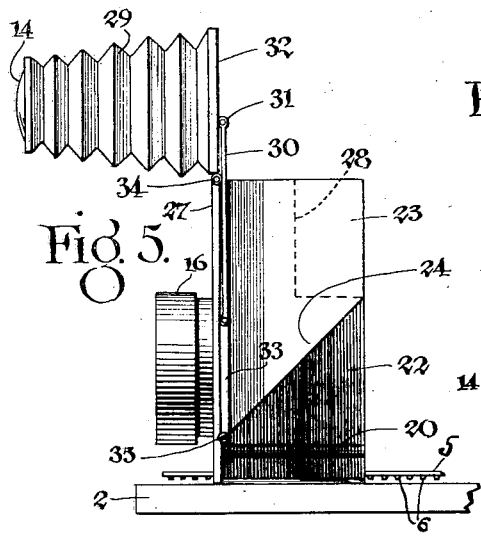
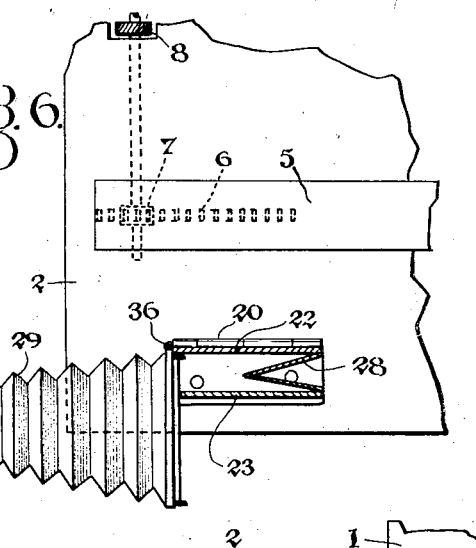
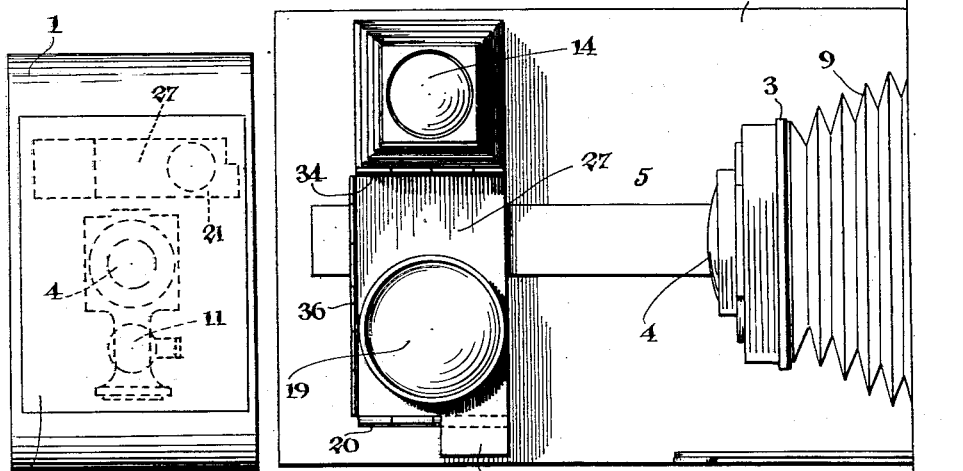
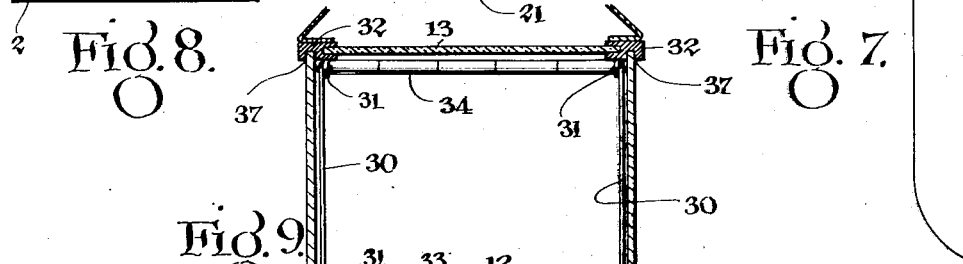
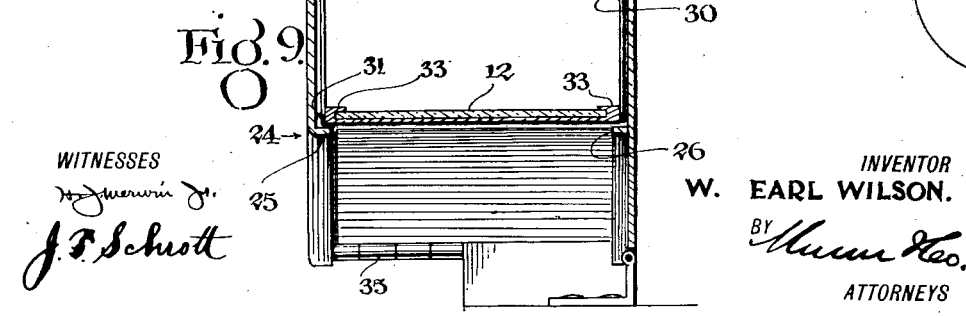
WITNESSES
INVENTOR
W. EARL WILSON.
BY
ATTORNEYS Patented July 15, 1924.

1,501,295

UNITED STATES PATENT OFFICE.

WILLIAM EARL WILSON, OF MOUNT RAINIER, MARYLAND.

FOCUSING VIEW FINDER.

Application filed October 5, 1921. Serial No. 505,573.

*To all whom it may concern:*

Be it known that I, WILLIAM EARL WILSON, a citizen of the United States, and a resident of Mount Rainier, in the county of Prince Georges and State of Maryland, have invented certain new and useful Improvements in Focusing View Finders, of which the following is a specification.

My invention relates to improvements in cameras, more especially in focusing devices therefor, and it consists in the constructions, combinations and mode of operation herein described and claimed.

One of the foremost objects of the invention is to provide a focusing view finder which will give a full-size image, right side up, having the same depth of field as the camera lens, and being in focus when the camera lens is focused on the plate.

A further object of the invention is to provide a focusing attachment which is fully collapsible so as to occupy but a small space inside of the camera box or frame when it is closed.

Other objects and advantages will appear in the following specification, reference being had to the accompanying drawings, in which:—

Figure 3:
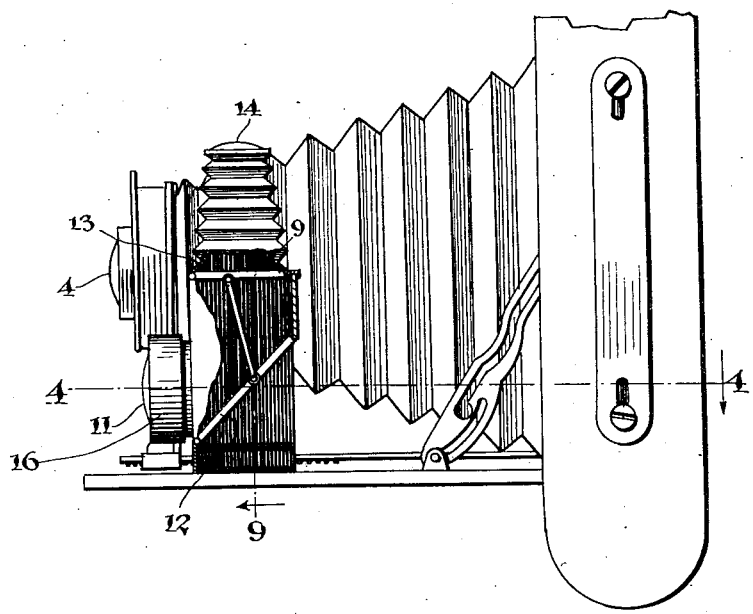
Figure 4:
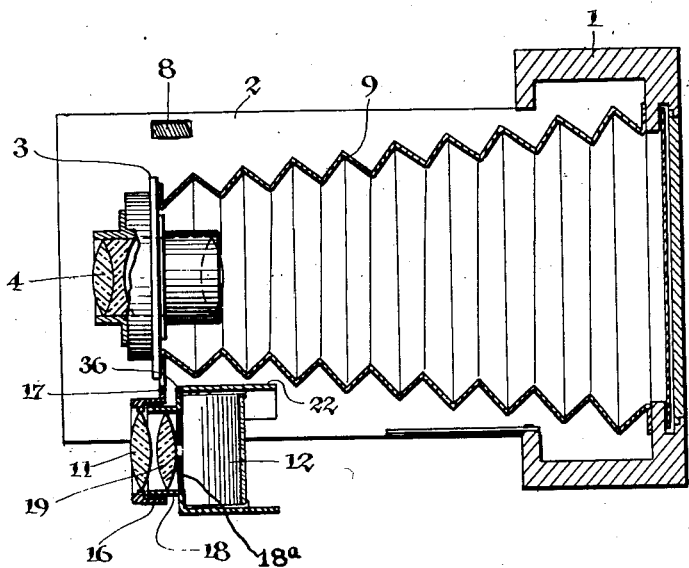

Figure 1 is a perspective view of an open camera, illustrating the improved finder in readiness for use, Figure 2 is a front elevation of the camera and of the view finder, Figure 3 is a side elevation of the camera, showing the view finder partly in section, Figure 4 is a horizontal section substantially on the line 4—4 of Figure 3, particularly illustrating all lenses and the reflecting mirror, Figure 5 is a detail side elevation illustrating the first step in folding the focusing view finder, Figure 6 is a plan view (partly in section) illustrating the second step in folding the view finder, Figure 7 is a plan view showing the last step in folding the finder which now rests on the camera bed, Figure 8 is a detail front elevation of the closed camera, illustrating (in dotted lines) the position that the finder assumes inside of the box, and Figure 9 is a vertical section on the line 9—9 of Figure 3.

The camera comprises the box 1 into which the bed 2 folds when the camera is closed as in Figure 8. The lens board 3, which carries the lens 4, slides on an extension or track 5. This track has a rack 6 (Fig. 6) on the underside, with which a pinion 7 engages to set the lens 4 by turning the thumbpiece 8. The bellows 9 behind the lens 4 excludes light from the sensitive plate or film.

The focusing view finder comprises a tube 16 carrying an object lens 11; a lens front 10 carrying a lens 19, a mirror 12, a ground glass screen 13 and an eyepiece lens 14. The object lens 11 (which should have the same focal length and aperture as the camera lens 4) produces a virtual image of the object sighted, which image is reduced by the lens 19 and reflected by the mirror 12 onto the ground glass screen 13 where it appears as a real image. An eyepiece lens 14 enlarges the real image to the size it will appear on the film, when viewed by the operator. If the aperture of the lens 11 differs from that of the camera lens, the focusing feature is still operative but the depth of field will not be equivalent to the depth of field of the image on the film.

A bracket 15 on the lens board 3 carries the outer cylinder 16 (Figs. 3 and 4) of a telescopic tube through a hinge connection 17 (Figure 2). The inner cylinder 18 of said tube is carried by the lens front 10. The purpose of the telescopic tube is to enable focusing the image in the finder by moving the outer lens 11 with the front 3 in respect to the inner fixed lens 19.

The view finder is hingedly mounted at 20 (Figure 6) to swing vertically into the active position from a rest position on the camera bed 2. A lug 21 provides both a stop for the view finder when it reaches the erect position (Figure 1) and a means for fixing the position of the lens 19. The hinge 20 connects the inner side 22 to the camera bed. The outer side 23 is cut away at 24 but is there provided with a flange 25 (Figure 9) for supporting the mirror 12 and making a light-tight joint. A corresponding flange 26 may be provided on the opposite side.

The finder front 27 is rigid. The back 28 (Figure 6) is collapsible so that it may be folded in when the side 23 is closed in readiness to fold the finder. To this end the eyepiece lens 14 is carried by a bellows 29 which is rigid enough when extended (Figs. 1 and 2) to support itself and the object lens.

Also, to aid the operation of closing the finder, braces 30 are hinged at 31 (Figs. 5 and 9) both to the frame 32 of the ground glass 13, and frame 33 of the mirror 12. Turning the bellows over to the left (Figure 5) on its hinge 34, moves the frame 33 on its hinge 35 and away from the flanges 25, 26. The front 27 swings horizontally on a hinge 36. Grooves 37 in the frame 32 hold the finder sides in position when open.

The operation is as follows: The camera front or lens board 3 is pulled out in the customary manner. All of the finder structure is carried by the bed 2 and only requires to be raised vertically from the rest position in Figure 7 to set it into the active position.

But the front lens 11 being carried by the board 3, must be moved around and back on the hinge 17 in order to fit it into place over the back lens 19. Although not necessarily used, the lens sleeve 18 (Fig. 4) is provided with an iris diaphragm 18$^a$ (similar to that behind the lens 4) so that there may be a conformity of light apertures.

Assuming the bellows 29 to have been extended and all other parts in readiness, focusing may commence. The front 3 is moved by the head 8 and the tube 16 with its lens 11, moves with it. The focused image of the object is reflected by the mirror 12 onto the ground glass screen 13 and is viewed by the eyepiece lens 14 and there appears at about the same apparent size as the image on the film would be.

To fold the finder turn the bellows 29 (Figure 5) toward the left. This raises the ground glass frame 32 and carries the mirror frame 33 with it by means of the brace 30. Both frames now stand vertically, the latter lying flat against the finder front 27.

The side 23 is now pressed in, the back 28 folding as in Figure 6. Since the outside 23 lies close against the inside 22, the front 27 may be swung counterclockwise on the hinge 36 (Fig. 6) packing the parts 27, 22, 23 and 28 close together. The bellows 29 is now collapsed. The whole is then folded over on the hinge 20 until it rests on the bed 2 (Figure 7). Upon closing the camera bed 2 (Figure 8) the finder will assume a position over the lens apparatus 4 and against the collapsed bellows 9.

While the construction and arrangement of the improved finder as herein described and claimed, is that of a generally preferred form, obviously modifications and changes may be made without departing from the spirit of the invention or the scope of the claims.

I claim:—

1. The combination of a camera lens board and camera bed, a focusing device comprising a relatively movable part carried by the lens board, and a relatively fixed part of the device carried by the camera bed.

2. The combination of a camera bed carrying a relatively fixed part of a focusing attachment which includes a fixed lens and screen; and a camera part which is movable to focus an image on a film, carrying a lens which is movable with said part in respect to said fixed lens to focus a like image on said screen.

3. A focusing view finder having a lens fixed in relation to a screen, and another lens movable in respect to both the screen and first lens.

4. A focusing view finder having a lens combination which is adjustable, a screen disposed parallel to the axes of the lenses, and a mirror for reflecting light entering the lenses upon the screen.

5. A focusing view finder, having a lens combination which is adjustable, a screen disposed parallel to the axes of the lenses, a mirror for reflecting light entering the lenses upon the screen, and an eyepiece lens for enlarging and viewing the image on said screen.

6. A view finder having foldable sides, and means holding them in position when open.

7. A view finder having rigid and foldable sides forming a box, and a screen-carrying frame hinged on one of the rigid sides to fit over the top of the box, having grooves to receive the edges of the remaining sides to hold the foldable sides extended.

8. In combination with a camera, a focusing view finder having a lens fixed in relation to a screen, and another lens movable in respect to both the screen and first lens, the movable lens having the same focal length as the camera lens.

9. A focusing view finder having a lens fixed in relation to a screen, and another lens movable in respect to both the screen and first lens, the movable lens having the same focal length and diameter as the lens of a camera to which the view finder is attached.

10. The combination of a camera lens board and camera bed, a focusing device comprising a lens carried by and movable with the lens board, a box carried by the camera bed upon which it is relatively fixed, a lens carried by the box adapted to cooperate with the other lens, a mirror in the box for reflecting an image, a screen in the box for receiving the image, and a lens carried by the box for enlarging said image to the size of the image which the camera is adapted to produce.

11. The combination of the lens board and bed of a camera, a focusing device comprising an object lens, a bracket by which said lens is mounted on the camera lens board to be movable therewith, an associated lens, a box by which said lens is carried and mounted on the lens board so as to be relatively fixed, a mirror carried by the box for reflecting an image formed by said lens, a screen carried by the box for receiving the image, and an eyepiece lens for enlarging the image on the screen to the size equal to that produced by the camera.

12. The combination of the lens board and bed of a camera, a focusing device comprising an object lens, a bracket by which it is mounted on the lens board to be movable therewith, an associated lens, a box by which said lens is carried and supported on the camera bed in a position relatively fixed in respect to the object lens, a mirror carried by the box adapted to reflect an image formed by said lenses, a screen for receiving said image, an eyepiece lens for viewing said image, and a movable support for said eyepiece lens by which it may be adjusted in respect to the screen.

13. The combination of the lens board and bed of a camera, a focusing device comprising an object lens, a bracket by which it is mounted on the lens board to be movable therewith, an associated lens, a box by which said lens is carried and supported on the camera bed in a position relatively fixed in respect to the object lens, a mirror carried by the box adapted to reflect an image formed by said lenses, a screen for receiving said image, an eyepiece lens for viewing said image, and a bellows supporting the eyepiece lens by means of which it is adjustable in respect to the screen.

14. In combination with the bed and lens board of a camera, a lens, a box by which said lens is supported on the bed, a reflecting mirror carried by the box, an eyepiece lens carried by the box, means by which the eyepiece lens is supported upon the box, means by which all of the aforesaid parts may be folded upon the camera bed when the latter is to be closed, an object lens, and a hinge bracket by which said lens is carried by the lens board permitting folding in of the object lens when the camera is closed but extension of the object lens to a position in front of the box lens when the camera is open and ready for operation.

15. A view finder comprising a box having foldable sides and back, a front by which said parts are carried, means by which the front is hinged to the bed of a camera to permit folding flat or standing in an erect position, a lug carried by the front providing a stop when the box is erected, a lens carried by the front which is located in the proper position when the lug engages the bed, a mirror hinged behind the front to reflect an image from the lens, and a screen having a frame hinged on the front having grooves to receive the edges of said sides and back to hold them in an extended position.

16. A view finder having rigid and foldable sides forming a box, a lens carried by the rigid side, flanges on opposite foldable sides, a mirror hinged to the rigid sides and being adapted to rest on said flanges when said sides are extended to form the box, and a screen mounted in a frame which is hinged on the rigid side and adapted to fit over the top of the box, said frame having grooves to receive the edges of the remaining sides to hold them extended.

17. A view finder comprising a box having a front, sides, a foldable back which connects the sides, a hinge by which one of the sides is joined to the front, a lens fixed in the front, a mirror hinged behind the front so as to reflect an image from the lens, a screen, a frame carrying the screen, a hinge by which the frame is connected to the top of the front, said frame having grooves to receive the edges of said sides and back to hold them extended in the shape of a box, and braces which are hingedly connected to the screen frame and mirror permitting folding said frame and mirror into the plane of the front preparatory to collapsing the back and one side upon the remaining side.

18. A view finder comprising a box having a front, sides, a foldable back which connects the sides, a hinge by which one of the sides is joined to the front, a lens fixed in the front, a mirror hinged behind the front so as to reflect an image from the lens, a screen, a frame carrying the screen, a hinge by which the frame is connected to the top of the front, said frame having grooves to receive the edges of said sides and back to hold them extended in the shape of a box, braces which are hingedly connected to the screen frame and mirror permitting folding said frame and mirror into the plane of the front preparatory to collapsing the back and one side upon the remaining side, and a hinge bracket by which said remaining side is mounted on the bed of a camera permitting folding the aforesaid parts down upon the bed when the front is swung around into the place of said remaining side.

W. EARL WILSON.